US005566430A

United States Patent [19]

Cheng

[11] Patent Number: 5,566,430

[45] Date of Patent: Oct. 22, 1996

[54] ENGAGING STRUCTURE OF TWO DECORATIVE ARTICLES

[76] Inventor: Tung-Tai Cheng, P.O. Box 82-144, Taipei, Taiwan

[21] Appl. No.: 489,161

[22] Filed: Jun. 9, 1995

[51] Int. Cl.$^{6}$ .................................................... F16B 21/00

[52] U.S. Cl. ................................ 24/590; 24/456; 411/549

[58] Field of Search ...................... 24/590, 456; 411/553, 411/552, 549; 63/9, 29.1

[56] References Cited

U.S. PATENT DOCUMENTS

| | | | |
|---|---|---|---|
| 189,258 | 4/1877 | Pope | 24/590 |
| 1,475,865 | 11/1923 | Peters | 24/590 |
| 1,864,371 | 6/1932 | Prussian | 63/29.1 |
| 2,693,014 | 11/1954 | Monahan | 24/590 |
| 3,180,606 | 4/1965 | Sabin et al. | 24/590 |
| 3,407,454 | 10/1968 | Myatt | 411/549 |
| 5,368,427 | 11/1994 | Pfaffinger | 411/553 |

FOREIGN PATENT DOCUMENTS

| | | | |
|---|---|---|---|
| 0423400 | 4/1911 | France | 24/590 |
| 0984599 | 7/1951 | France | 24/590 |

*Primary Examiner*—Victor N. Sakran
*Attorney, Agent, or Firm*—Alfred Lei

[57] ABSTRACT

An engaging structure of two decorative articles including a female seat formed at a center with a circular opening having two opposite grooves and provided at one side with an arch-like member located over the circular opening and having two legs, and a male seat formed at one side with a cylindrical pin having two opposite protrusions extending radially outwardly from an upper end thereof, the protrusions being adapted to go through the grooves of the female seat, whereby the two decorative articles can be conveniently engaged or disengaged.

1 Claim, 8 Drawing Sheets

ENGAGING STRUCTURE OF TWO DECORATIVE ARTICLES

BACKGROUND OF THE INVENTION

1. Field of the Invention

This invention relates to an engaging structure of two articles and in particular to one which can facilitate the engagement and disengagement between two decorative articles.

2. Description of the Prior Art

It has been found that the conventional way to engage two decorative articles is simply achieved by engaging a ring portion of an article with a retainer clip of another. However, such a retainer clip is complicated in structure and high in manufacturing cost.

Therefore, it is an object of the present invention to provide an engaging structure of two articles which can obviate and mitigate the above-mentioned drawbacks.

SUMMARY OF THE INVENTION

This invention relates to an improved engaging structure of two decorative articles.

It is the primary object of the present invention to provide an engaging structure of two decorative articles which can facilitate the engagement and disengagement between two decorative articles.

It is another object of the present invention to provide an engaging structure of two decorative articles which is easy to manufacture.

It is still another object of the present invention to provide an engaging structure of two decorative articles which is simple in construction.

It is still another object of the present invention to provide an engaging structure of two decorative articles which is convenient and reliable in use.

It is a further object of the present invention to provide an engaging structure of two decorative articles which is fit for practical use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
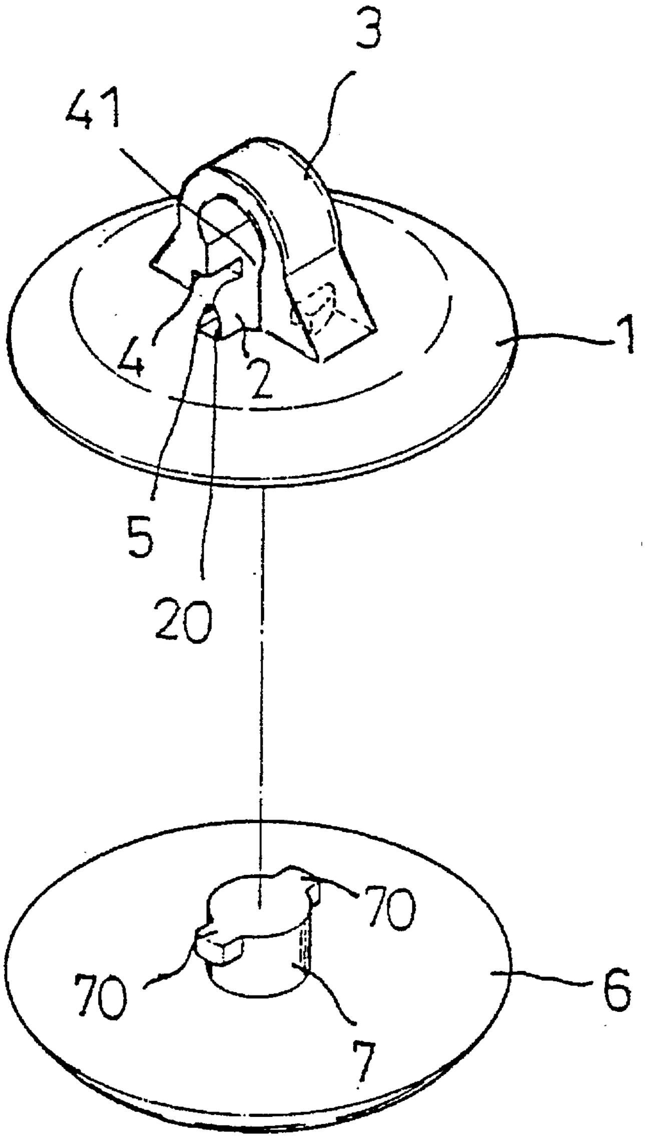
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
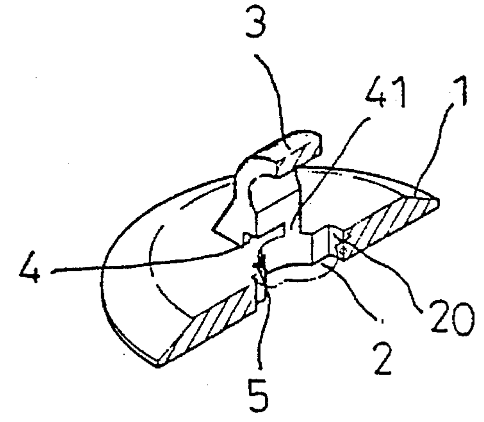
FIG. 2 is a sectional view of the female seat.
Figure 3:
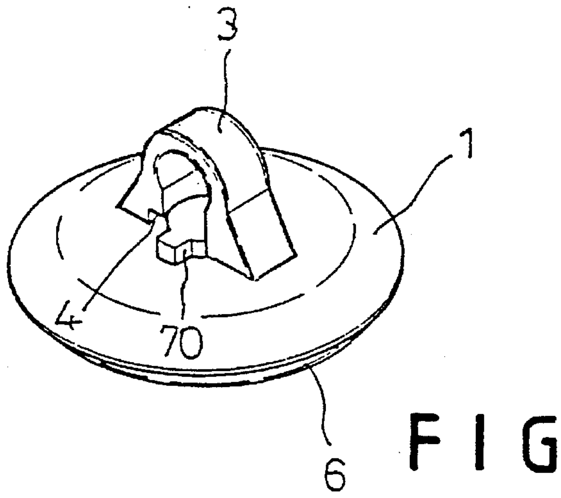
FIG. 3 is a perspective view of the present invention.
Figure 4:
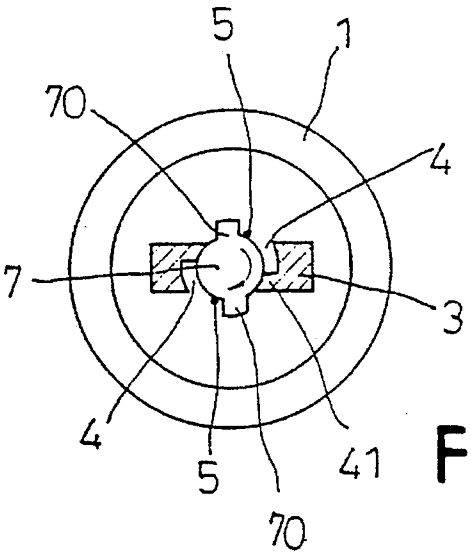
FIG. 4 is a sectional view of FIG. 3.
Figure 5:
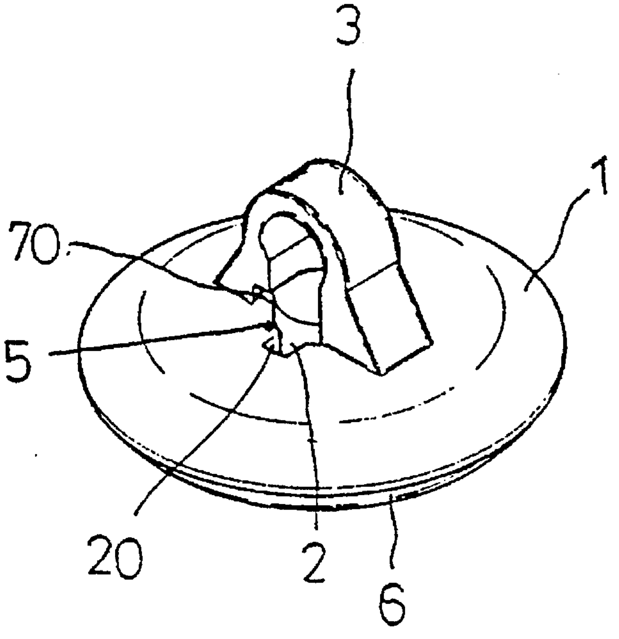
FIG. 5 illustrates the locking condition of the present invention.
Figure 6:
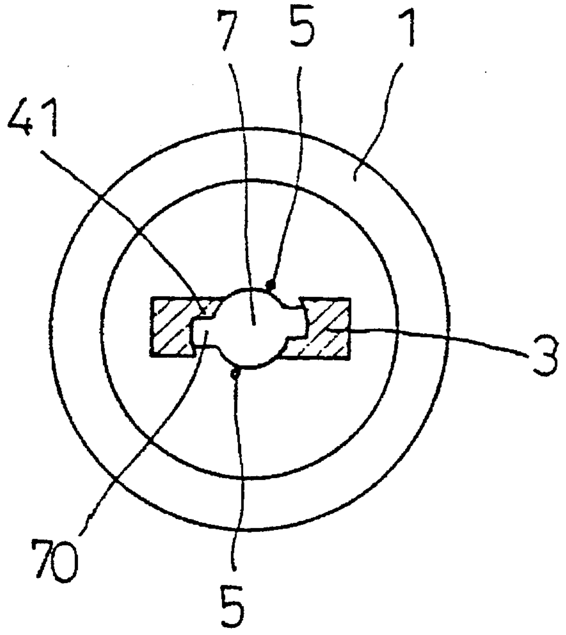
FIG. 6 is a sectional view of FIG. 5.
Figure 7:
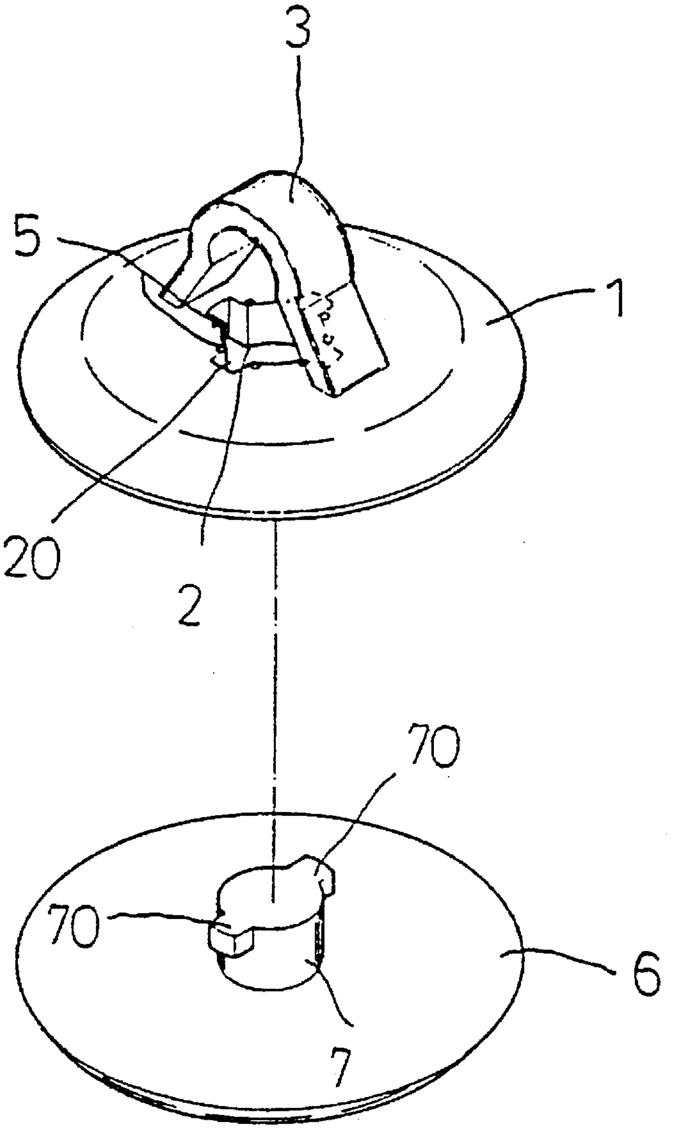
FIG. 7 illustrates a second preferred embodiment of the present invention.
Figure 8:
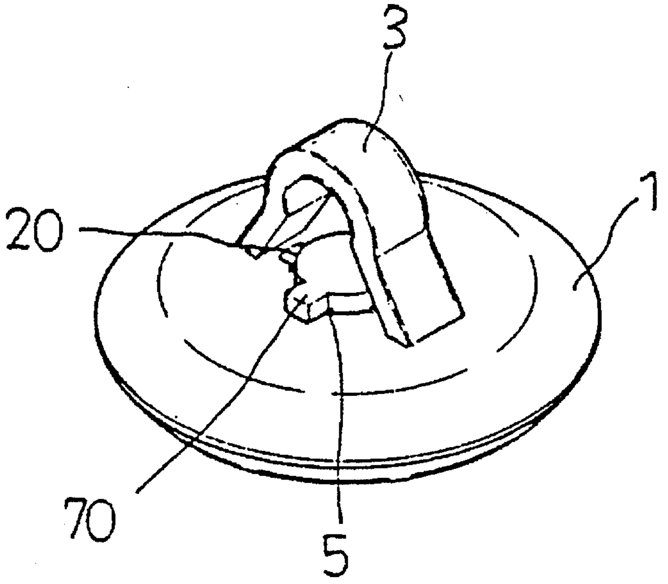
FIG. 8 is a perspective view of the second preferred embodiment.
Figure 9:
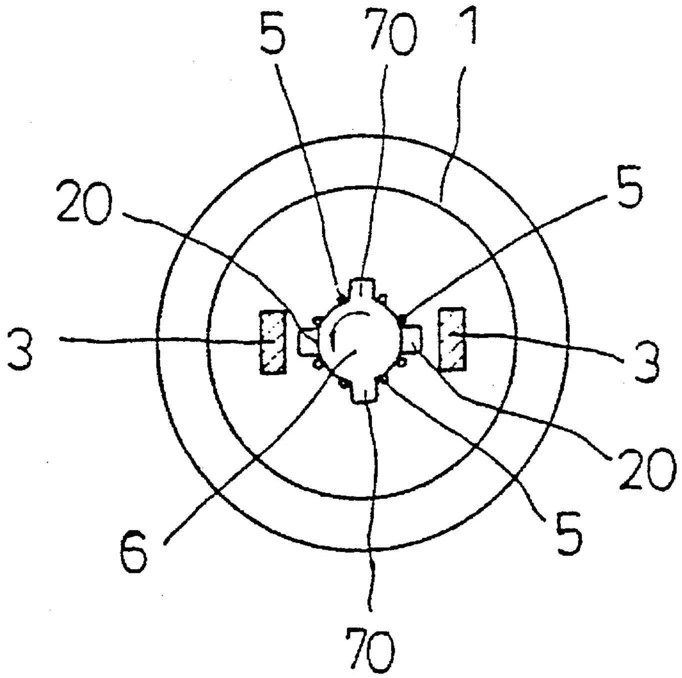
FIG. 9 is a sectional view of FIG. 8.
Figure 10:
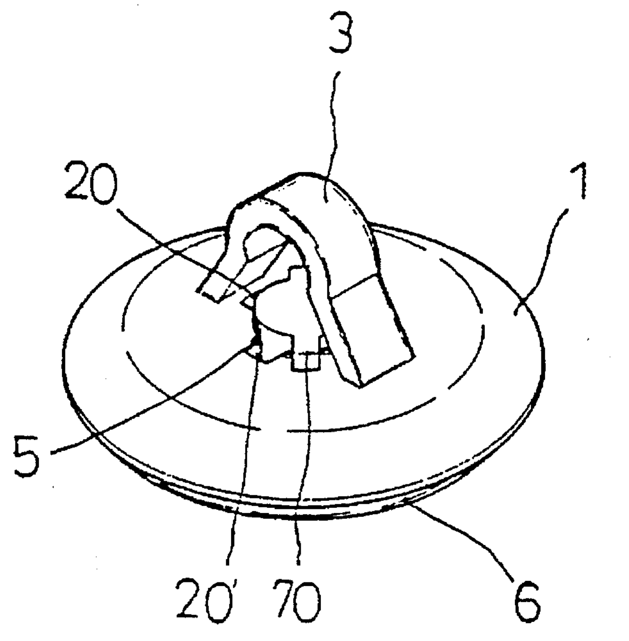
FIG. 10 illustrates the locking condition of the second preferred embodiment.
Figure 11:
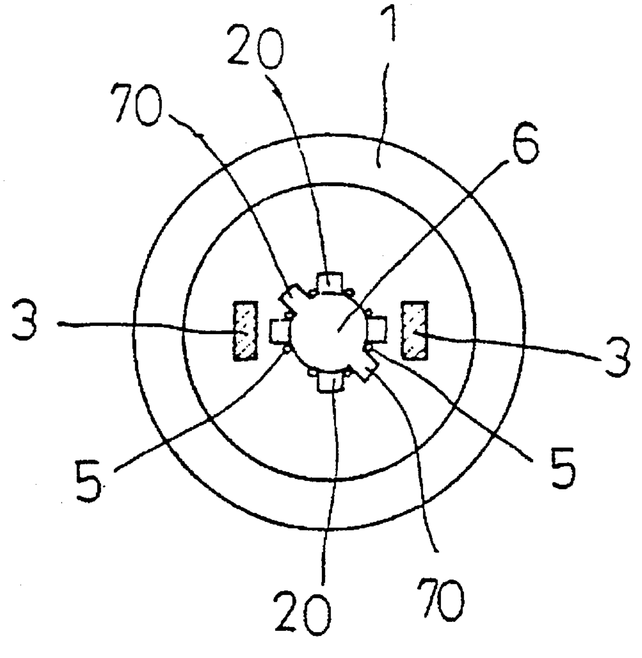
FIG. 11 is a sectional view of FIG. 10.
Figure 12:
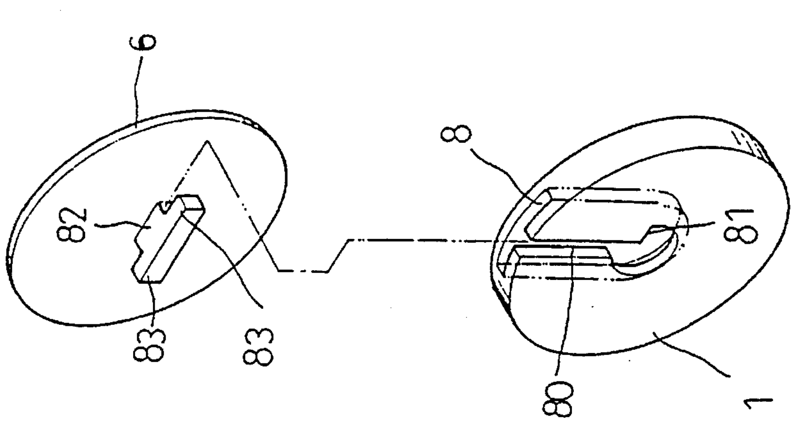
FIG. 12 is an exploded view of a third preferred embodiment of the present invention.
Figure 13:
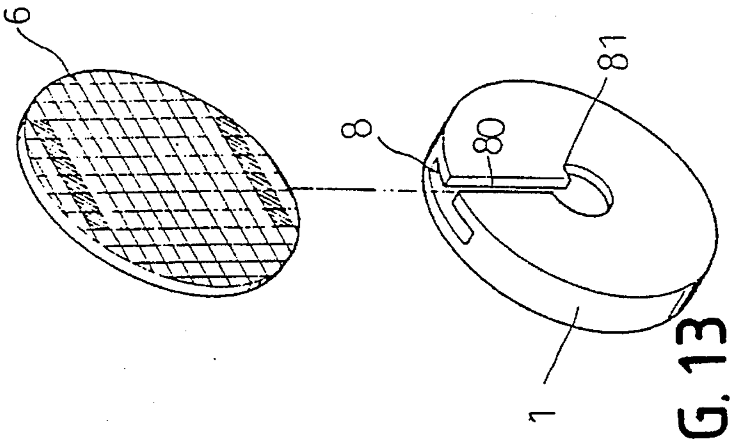
FIG. 13 is another exploded view of the third preferred embodiment of the present invention.
Figure 14:
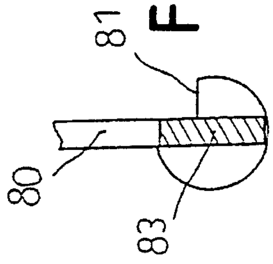
FIG. 14 is a sectional view of the third preferred embodiment.
Figure 15:
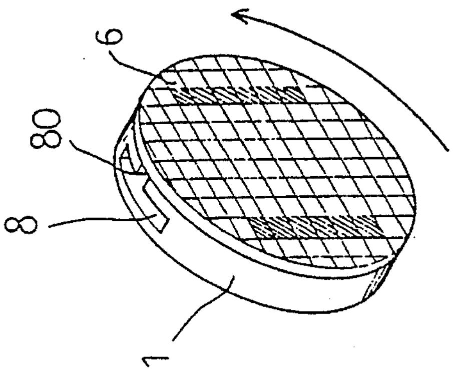
FIG. 15 illustrates the locking condition of the present invention.
Figure 16:
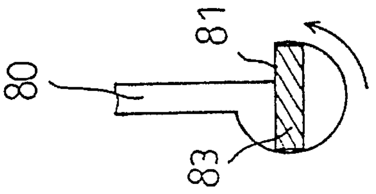
FIG. 16 is a sectional view of FIG. 15.
Figure 20:
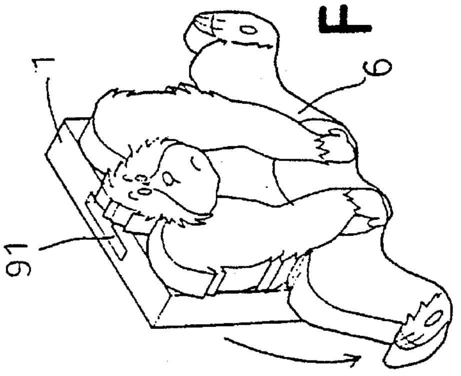
FIG. 20 illustrates the locking condition of the present invention.
Figure 18:
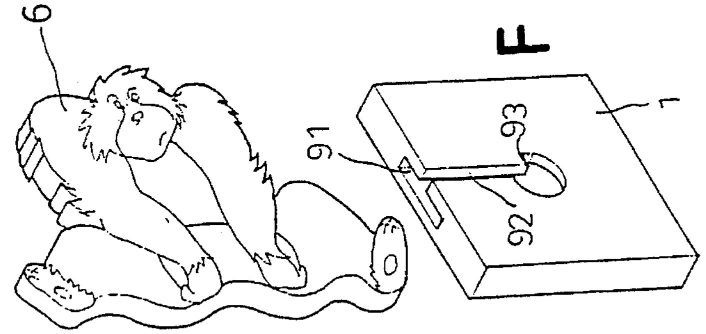
FIG. 18 is another exploded view of the fourth preferred embodiment.
Figure 21:
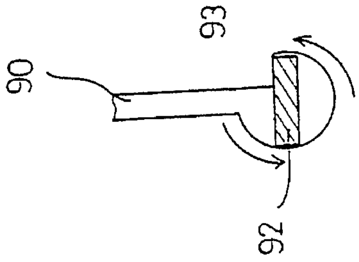
FIG. 21 is a sectional view of FIG. 20.
Figure 19:
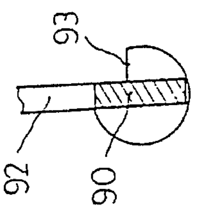
FIG. 19 is a sectional view of the fourth preferred embodiment.
Figure 17:
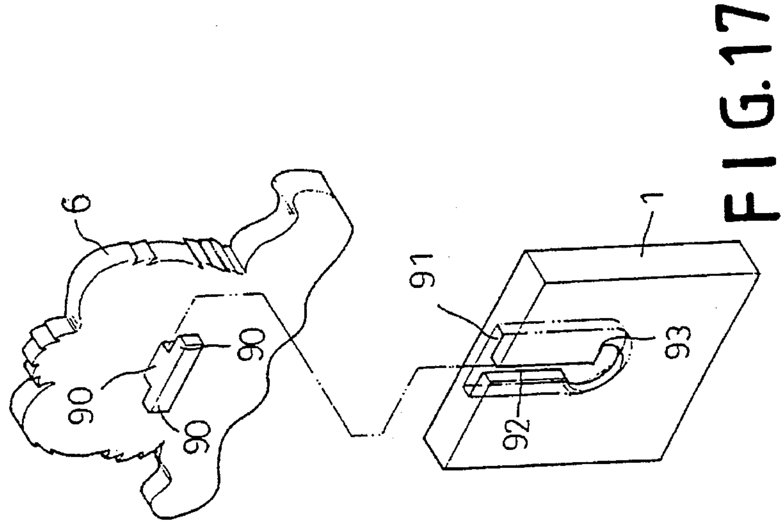
FIG. 17 is an exploded view of a fourth preferred embodiments.

With reference to the drawings and in particular to FIGS. 1 and 2 thereof, the present invention mainly comprises a female seat 1 and a male seat 6.

The female seat 1 is formed at the center with a circular opening 2 having two opposite grooves 20. On the upper side of the female seat 1 there is an arch-like member 3 located over the circular opening 2 and having two legs 41 formed with a recess 4 at an inner side thereof. Two protuberances 5 are each provided on the female seat 1 between the groove 20 and the circular opening 2.

The male seat 6 is formed at the center with a cylindrical pin 7 having two opposite protrusions 70 extending radially outwardly from the upper end thereof.

In assembly (see FIGS. 3, 4, 5 and 6), the male seat 1 is arranged on the female seat 6, with the cylindrical pin 7 of the male seat 6 fitted within the circular opening 2 of the female seat 1. Then, the male seat 6 is turned so that the protrusions 70 of the male seat 6 pass over the protuberances 5 to fit into the recesses 4 of the female seat 1 thereby locking the female seat 1 and the male seat 6 together.

FIGS. 7, 8, 9, 10 and 11 show a second preferred embodiment of the present invention. As shown, the female 1 is formed at the center with a circular opening 2 having two pair of opposite grooves 20. On the upper side of the female seat 1 there is an arch-like member located above the circular opening 2. Two protuberances 5 are provided on the female seat 1 between every two adjacent grooves 20. The male seat 6 is formed at the center with a cylindrical pin 7 having two opposite protrusions 70 extending radially outwardly from the upper end thereof.

FIGS. 12, 13, 14, 15 and 16 illustrate a third preferred embodiment of the present invention. As illustrated, the female seat 1 is formed at the center with an axial opening having a stop edge 81 and a radial slot 80 open at an outer end and a radial recess 8 in communication with the opening. The male seat 6 is formed with a T-shaped member 82 having two arms 83 adapted to fit into the recess 8.

FIGS. 17, 18, 19, 20 and 21 illustrate a fourth preferred embodiment of the present invention. As illustrated, the female seat 1 is formed at the center with an axial opening having a stop edge 93 and a radial slot 92 open at an outer end and a radial recess 91 in communication with the opening. The male seat 6 is a decorative member formed with a T-shaped member 90 having two arms adapted to fit into the recess 91.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An engaging structure of two decorative articles comprising:

a male seat formed at one side with a cylindrical pin having at least a pair of opposite protrusions extending radially outwardly from an upper end thereof; and a female seat formed at a center with a circular opening having at least a pair of opposite grooves for passage of said protrusions of said male seat and provided at one side with an arch-like member located over said circular opening and having two legs, one of said two legs of said arch-like member being formed with a first recess at an inner side thereof for receiving one of said protrusions of said male seat while another one of said two legs of said arch-like member being formed with a second recess at an inner side thereof for receiving another one of said protrusions of said male seat, said first recess being diagonally opposite to said second recess, said female seat being provided thereon with two protuberances one between said opening and each of said two grooves.

* * * * *